United States Patent [19]

Yoshida et al.

[11] Patent Number: 5,834,913
[45] Date of Patent: Nov. 10, 1998

[54] METHOD AND APPARATUS FOR CONTROLLING MOTOR ROTATION, AND A DISK SIGNAL REGENERATING APPARATUS USING THE MOTOR

[75] Inventors: Shuichi Yoshida; Noritaka Akagi; Yoshiki Kuno, all of Osaka, Japan

[73] Assignee: Matsushita Electric Industrial Co., Ltd., Osaka, Japan

[21] Appl. No.: 623,193

[22] Filed: Mar. 28, 1996

[30] Foreign Application Priority Data

Mar. 31, 1995 [JP] Japan .................................... 7-075452

[51] Int. Cl.⁶ ...................................................... H02P 7/00
[52] U.S. Cl. ........................... 318/270; 388/840; 318/442
[58] Field of Search ..................... 318/55, 56, 60, 318/63, 64, 90, 268, 269, 270, 271, 272, 273, 274, 362, 369, 375, 376, 254, 437, 138, 442; 388/842, 843, 844, 847, 902, 903, 904, 840

[56] References Cited

U.S. PATENT DOCUMENTS

4,052,647  10/1977  Thompson ............................. 318/139
4,117,382   9/1978  Yonemoto .............................. 318/163
4,423,363  12/1983  Clark et al. ............................ 318/375
4,608,524   8/1986  Yokobori ............................... 318/254
4,712,054  12/1987  Boldt .................................... 318/809
4,775,945  10/1988  Cavill et al. ....................... 318/569 X
4,939,440   7/1990  Burke ................................. 318/434 X
5,208,741   5/1993  Kumar ................................... 318/375
5,256,944  10/1993  Tobise et al. .......................... 318/799

Primary Examiner—Jonathan Wysocki
Attorney, Agent, or Firm—Wenderoth, Lind & Ponack, L.L.P.

[57] ABSTRACT

The present invention provides the following rotation control method for reducing energy consumption of a motor driving a disk. In a constant speed mode, a supply voltage V1 for driving the motor at a constant speed N1 is selected; however, at a lower constant speed N2, a supply voltage V2 lower than V1 is selected. In an acceleration mode for accelerating the motor speed from N2 to N1, a higher supply voltage than V1 is selected just before starting acceleration, and then V1 is selected after the acceleration. In a speed deceleration mode for decelerating the motor speed from N1 to N2, a lower supply voltage than V1 is selected just before starting deceleration, then the supply voltage V2 is selected after the decleration.

2 Claims, 10 Drawing Sheets

FIG. 2

FIG. 4(a)
Ia=0.10[A]/Tq=20[gcm]

FIG. 4(b)
Ia=0.10[A]/Tq=20[gcm]

FIG. 4(c)
Ia=0.3[A]/Tq=60[gcm]

FIG. 4(d)
Ia=0.3[A]/Tq=60[gcm]

FIG. 4(e)
Ia=0.3[A]/Tq=60[gcm]

FIG. 4(f)
Ia=0.3[A]/Tq=60[gcm]

Ia=0.10[A]/Tq=20[gcm]

FIG. 10(b)
(PRIOR ART)

Ia=0.10[A]/Tq=20[gcm]

FIG. 10(c)
(PRIOR ART)

Ia=0.25[A]/Tq=50[gcm]

FIG. 10(d)
(PRIOR ART)

Ia=0.14[A]/Tq=28[gcm]

FIG. 10(e)
(PRIOR ART)

Ia=0.3[A]/Tq=60[gcm]

FIG. 10(f)
(PRIOR ART)

Ia=0.3[A]/Tq=28[gcm]

FIG. 11

METHOD AND APPARATUS FOR CONTROLLING MOTOR ROTATION, AND A DISK SIGNAL REGENERATING APPARATUS USING THE MOTOR

FIELD OF THE INVENTION

The present invention relates to controlling the rotation of a spindle motor driving a disk.

CONVENTIONAL ART

Figure 8:
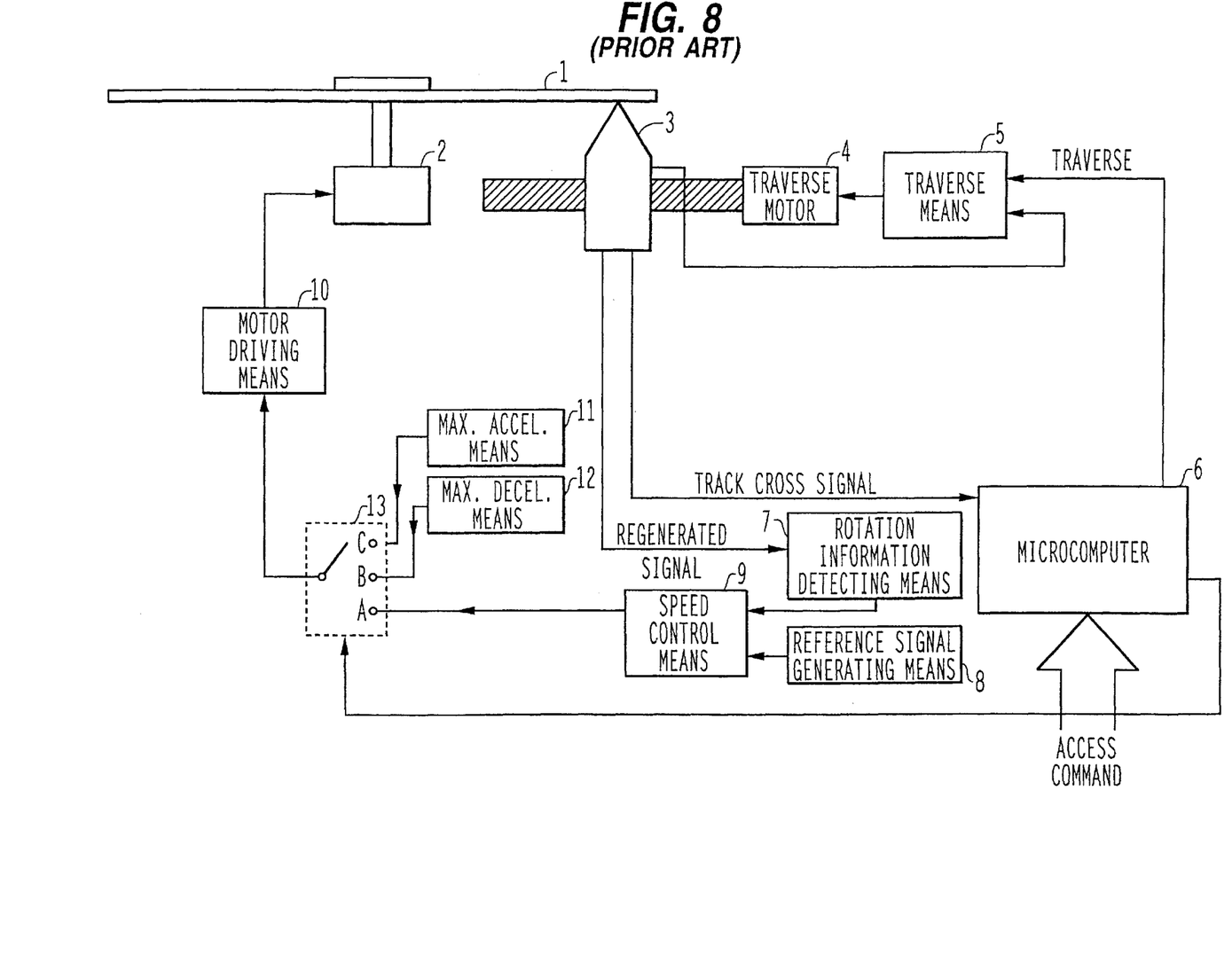
FIG. 8 illustrates a structure of a conventional disk signal regenerating apparatus.

FIG. 8 illustrates a conventional disk-signal-regenerating-apparatus of a constant line or velocity type. A spindle motor 2 drives a disk 1. A pickup means 3 regenerates a signal recorded on the disk 1 by using light beam, and transmits a regenerated signal to a data processing means (not shown) as well as feeds the regenerated signal into a rotation information detecting means 7. The pickup means 3 outputs a track-cross signal every time a beam locus crosses recording tracks when the pickup means 3 moves along a radial direction of the disk 1. A micro-computer 6 counts the track-cross signal in order to recognize a position of the pickup means 3. The micro-computer 6 outputs a traverse command into a traverse controlling means 5 when a new command of a target address for the pickup means 3 is given by an access command. When receiving the traverse command, the traverse means 5 drives a traverse motor 4 to move the pickup means 3 disposed on a ball screw toward the target address. Since a disk is driven at a constant line or velocity, a spindle motor rotation speed must be changed when the pickup means 3 changes the position to the track-cross direction. The rotation of a spindle motor 2 is controlled in three modes: 1. compulsive rotation control, 2. rough rotation control, 3. precise rotation control. In the compulsive rotation control mode, a rotation speed of the spindle motor 2 is accelerated or decelerated. In the rough rotation control mode, the rotation speed of spindle motor 2 is controlled close to a target speed. In the precise rotation control mode, the rotation speed of spindle motor 2 is controlled at the target speed precisely.

In the compulsive rotation control mode, a switching means 13 selects switch B or switch C according to a command of the micro-computer 6, then a maximum acceleration means 11 or maximum deceleration means 12 gives a command of maximum acceleration or maximum reduction to a motor driving means 10. In the rough or precise rotation control mode, the switching means 13 selects switch A according to a command of micro-computer 6. In the rough rotation control mode, a rotation information detecting means 7 detects the longest period pulse among signals recorded on the disk 1, and converts the inverse of the period into a voltage to produce a period voltage. A speed control means 9 compares this period voltage with a reference voltage generated from a reference signal generating means 8. Then a control signal adaptive to the comparison result is transmitted to the motor driving means 10 so that the spindle motor speed roughly agrees with the target speed. In the precise rotation control mode, the rotation information detecting means 7 detects a synchronous signal among signals recorded on the disk 1. The speed control means 9 compares the synchronous signal with a frequency of a reference signal. Then a control signal adaptive to the comparison result is transmitted to the motor driving means 10 so that the spindle motor speed precisely agrees with the target speed.

Figure 9:
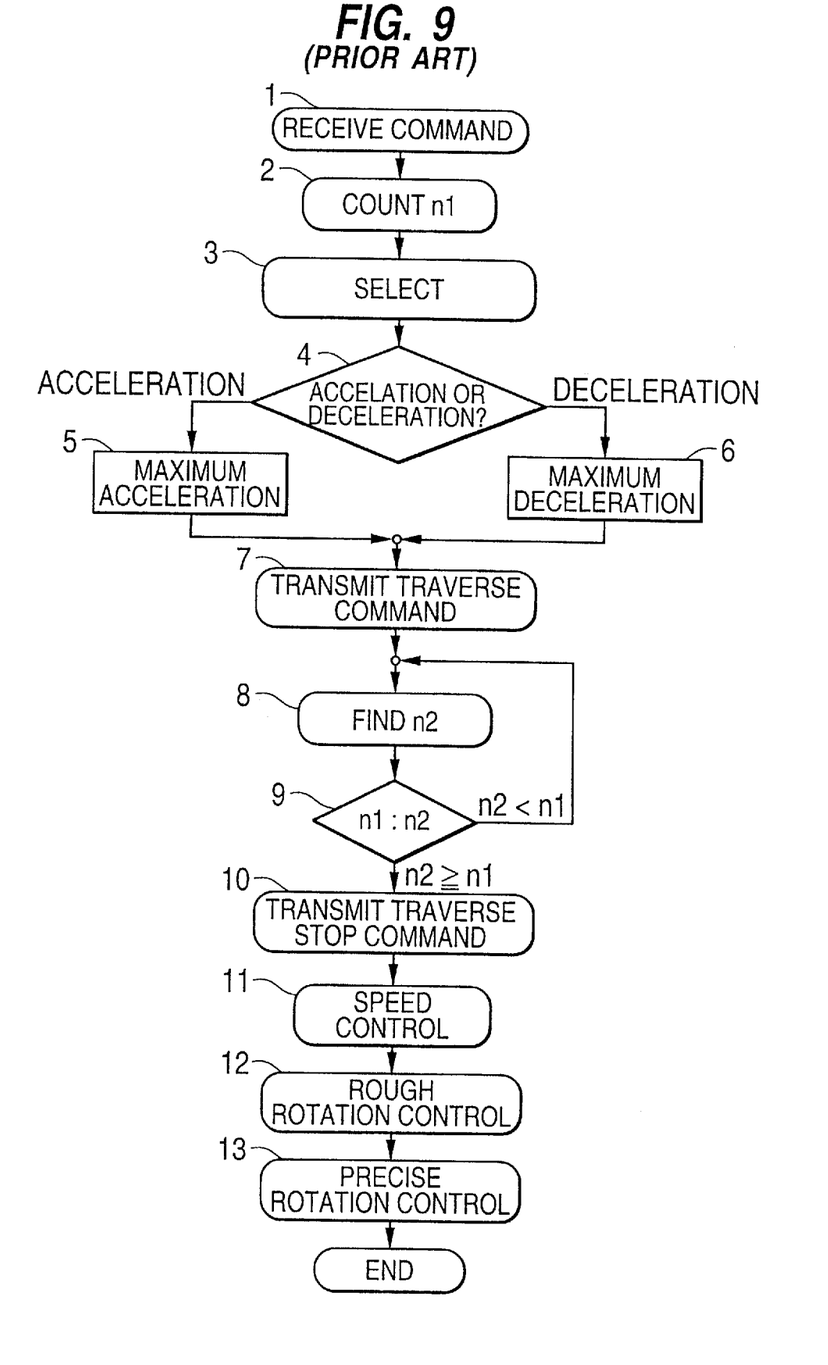
FIG. 9 shows an operation in the access mode of the microcomputer incorporated in the conventional disk signal regenerating apparatus.

The disk signal regenerating apparatus has three operation modes: 1. access mode, 2. data regenerating mode, and 3. hold track mode. FIG. 9 is a flow chart illustrating an operation of the access mode of the micro-computer 6 shown in FIG. 8.

Step 1. Receive an access command.

Step 2. Count a number of tracks n1 upto the target address and recognize a direction of the traverse.

Step 3. Select the compulsive rotation control.

Step 4. Judge whether the spindle motor is accelerated or decelerated. Since a disk is driven at a constant line or velocity, when a traverse is directed outside, a speed of the spindle motor is decelerated, and when inside, accelerated.

Step 5. When accelerating a speed of spindle motor 2, the switching means 13 connects the maximum acceleration means 11 to the motor driving means 10. Then, the maximum acceleration command is given, to the motor driving means 10 by an open loop control.

Step 6. When decelerating a speed of spindle motor 2, the switching means 13 connects the maximum decelerating means 12 to the motor driving means 10. Then the maximum decelerating command is given to the motor driving means 10 by an open loop control.

Step 7. The micro-computer 6 transmits a traverse command to the traverse control means 5.

Step 8. The micro-computer 6 counts the track-cross signal to find n2 signals being counted.

Step 9. Compares n1 with n2.

Step 10. When n2>n1 is found, the microcomputer 6 transmits a traverse stop command to the traverse control means 5.

Step 11. The switching means 13 connects the speed control means 9 to the motor driving control means 10. The rotation control of spindle motor 2 changes into a closed loop control.

Step 12. Since the spindle motor speed does not reach the target speed yet, the rough rotation control is selected. The spindle motor speed is thus controlled close to the target speed.

Step 13. The precise rotation control is selected. The spindle motor speed is thus precisely controlled at the target speed.

The operation of the disk signal regenerating apparatus moves into the data regeneration mode at the step 13. In the data regeneration mode, the pickup means 3 follows a spiral track of the disk for regenerating data. After regenerating data, the disk signal regenerating apparatus stands by for the next access command in a hold-track-mode. Data is not regenerated in the hold-track-mode. The pickup means 3 returns to an original position every rotation of the disk so that it can follow the same track repeatedly.

FIG. 10(a) through FIG. 10(f) explain an energy loss due to controlling motor speed. A power transistor 901 incorporated in the motor driving means 10 represents a plurality of power transistors connected in a bridge or other forms. An armature coil or motor coil, 902 of the spindle motor 2, includes a resistor Ra and an induced voltage Ea. The motor coil 902 represents a polyphase coil. A magnetic field of the spindle motor 2 comprises a permanent magnet (not shown). The numeral 905 represents a power supply.

In FIG. 10(a) through FIG. 10(d) illustrating a motor driving, the equations (1) through (6) are found.

$$Ea = Ka \cdot N \tag{1}$$

$$Va = Ra \cdot Ia \tag{2}$$

$$Vd = Vm - Ea - Va = Vm - Ka \cdot N - Ra \cdot Ia \qquad (3)$$

$$Pd = Vd \cdot Ia \qquad (4)$$

$$Pa = Va \cdot Ia \qquad (5)$$

$$Tq = Kt \cdot Ia \qquad (6)$$

Figure 10A:
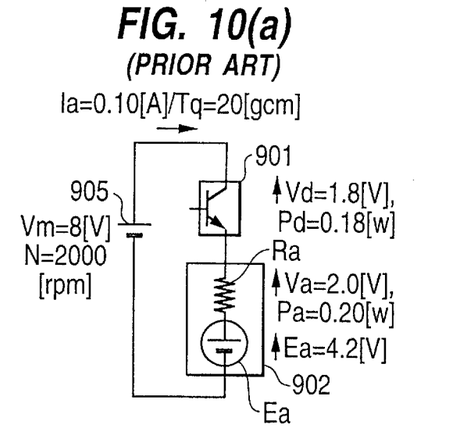
FIG. 10(a) through FIG. 10(f) explains energy loss due to a motor speed control with a conventional method.
Figure 10B:
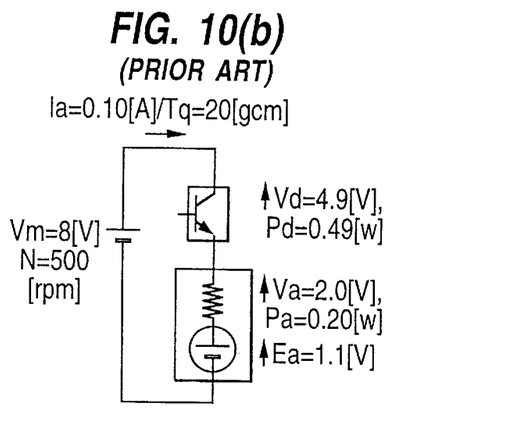
Figure 10C:
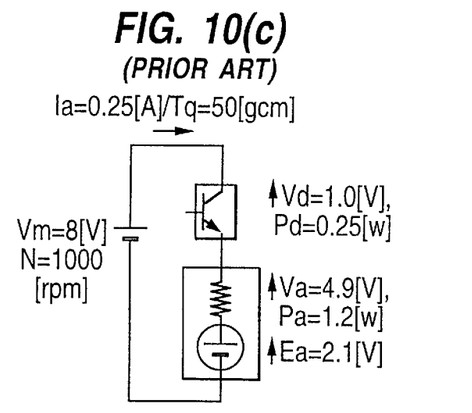
Figure 10D:
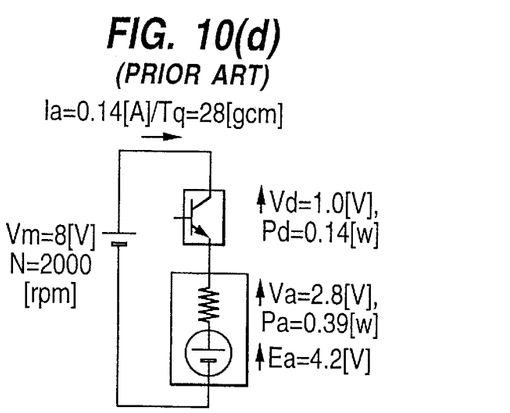
Figure 10E:
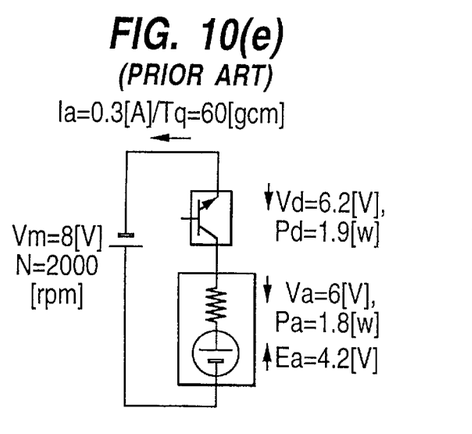
Figure 10F:
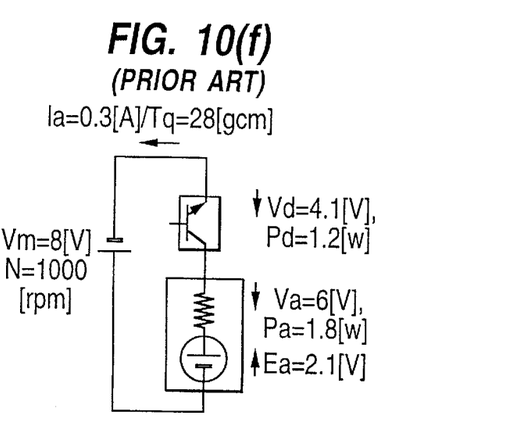

In FIG. 10(e) and FIG. 10(f) showing a motor breaking where Vm is reversely connected, the equation (7) is found.

$$Vd = Vm + Ea - Va = Vm + Ka \cdot N - Ra \cdot Ia \qquad (7)$$

where
Ea=induced voltage of the motor coil (V)
N=motor speed (r.p.m.)
Ka=induced voltage constant (V/r.p.m.)
Ra=a resistor of the motor coil ($\Omega$)
Va=terminal voltage of Ra (V)
Ia=motor current (A)
Vd=terminal voltage of the power transistor (V)
Vm=supply voltage of the power supply (V)
Pd=power consumption of the power transistor (W)
Pa=power consumption of the motor coil resistor (W)
Kt=torque constant (g·cm/A)

The precise rotation control, compulsive rotation control, and rough rotation control of the spindle motor 2 are explained by using the following values as examples:
Ka=2.1 (mV/r.p.m.), Ra=20 ($\Omega$), Ia.max=0.3 (A),
Vm=8 (V), Kt=200 (g·cm/A)

FIG. 10(a) and FIG. 10(b) illustrate the precise rotation control of the spindle motor 2. In FIG. 10(a), the motor rotates at a constant speed 2000 r.p.m. which requires a torque of 20 (g·cm) in order to maintain this constant speed.
Using the equation (6), Ia=0.1 (A)
Using the equation (1), Ea=4.2 (V)
Using the equation (3), Vd=1.8 (V)
Using the equation (4), Pd=0.18 (W)

The power consumption Pd of the power transistor is not a problematic factor in a long-time precise-rotation-control for the data regeneration mode or the hold track mode.

FIG. 10(b) illustrates the motor rotating at a constant speed of 500 r.p.m, which requires a torque of 20 (g·cm) to maintain this constant speed.
Using the equation (1), Ea=1.1 (V)
Using the equation (3), Vd=4.9 (V)
Using the equation (4), Pd=0.49 (W)

As explained in the above description, when a speed of the motor lowers, a power consumption Pd of the power transistor rises. The power consumption of the motor coil and the power transistor further increase when an inertia or an eccentricity of the disk becomes larger. The power consumption not only wastes electric power but also raises temperatures of the motor, power transistor and apparatus, which lowers the reliability of the apparatus. A heat radiator may be mounted to the power transistor in order to reduce the temperature rise; however, it increases the size and cost of the apparatus.

FIG. 10(c) and FIG. 10(d) illustrate an acceleration of the spindle motor 2 in the compulsive rotation control and the rough rotation control. An example shows that N1=1000 r.p.m. is accelerated to N2=2000 r.p.m.

In the case of FIG. 10(c), when starting acceleration, the speed is 1000 r.p.m.
Using the equation (1), Ea=2.1 (V) Since the power transistor is saturated by a quick acceleration,
Vd=1.0 (V) is found.
Using the equation (3), Va=4.9 (V)
Using the equation (2), Ia=0.25 (A)
Using the equation (6), Tq=50 (g cm)

In the case of FIG. 10(d), just before ending acceleration, the speed is 2000 r.p.m.
Using the equation (1), Ea=4.2 (V) and Vd=1.0 (V)
Using the equation (3), Va=2.8 (V)
Using the equation (2), Ia=0.14 (A)
Using the equation (6), Tq=28 (g cm)

In the case of acceleration illustrated in FIG. 10(c) and FIG. 10(d), the power consumption of the power transistor is not substantially large since the power transistor is saturated. However, the induced voltage Ea which blocks motor current is comparatively large, and the current large enough to produce a large torque cannot be supplied. Further, since the induced voltage Ea increases in proportion to the motor speed, a produced torque decreases accompanied with increasing a motor speed. Thus a longer acceleration time is required than the case where an initial torque in starting acceleration is maintained. A time for accelerating N1 r.p.m. to N2 r.p.m. under a constant torque Tq is found with the following equation (8).

$$dt = \frac{(N2 - N1) \cdot J}{Kj \cdot Tq} \qquad (8)$$

where
J: composite inertia of the disk and motor
Kj: constant=9350

FIG. 10(e) and FIG. 10(f) illustrate a speed deceleration of spindle motor 2 in the compulsive and rough rotation controls. The speed is decelerated by a reverse phase braking. The power transistor 901 in a bridge coupling supplies a reverse supply voltage to the motor so that the motor generates counter torque. The example shows that N2=2000 r.p.m. is reduced to N1=1000 r.p.m.

In the case of FIG. 10(e), the motor speed is 2000 r.p.m. when the deceleration starts.
Using the equation (1), Ea=4.2 (V) Ia.max=0.3 (A) is fed into the motor.
Using the equation (2), Va=6 (V)
Using the equation (7), Vd=6.2 (V)
Using the equation (4), Pd=1.9 (W)
Using the equation (5), Pa=1.8 (W)
Using the equation (6), Tq=60 (g cm)

In the case of FIG. 10(f), just before ending the deceleration, the speed is 1000 r.p.m.
Using the equation (1), Ea=2.1 (V) works out.
Using the equation (2), Va=6 (V) works out.
Using the equation (7), Vd=4.1 (V) works out.
Using the equation (4), Pd=1.2 (W) works out.
Using the equation (5), Pa=1.8 (W) works out.
Using the equation (6), Tq=60 (g cm) works out.

The power consumption Pd of the transistor is substantially large in the speed deceleration shown in FIG. 10(e) and FIG. 10(f). Accordingly, frequent starts and stops of the motor would raise a temperature of the apparatus and result in lowering the reliability of the apparatus. A heat radiator is mounted to the power transistor in order to decrease the temperature rise; however, the heat radiator increases the size and cost of the apparatus.

The motor rotation control of the present invention is to solve the above problems. It can decrease the power consumption of the power transistor in a low-speed precise-rotation-control, and further, it can decrease the power consumption of the power transistor during accelerating and deceleration both in the compulsive and rough rotation controls.

SUMMARY OF THE INVENTION

The present invention relates to a rotation control which decreases energy consumption of a disk-driving-motor.

In a constant speed mode, a supply voltage V1 for driving a motor at a constant speed N1 is selected, and another supply voltage V2 lower than V1 is selected at another constant speed N2 which is slower than N1. In an acceleration mode during which the motor is accelerated from N2 to N1, a higher supply voltage than V1 is selected just before acceleration, and then V1 is selected after the acceleration. In a decelerating mode during which the motor is decelerated from N1 to N2, a lower supply voltage than V1 is selected, and then V2 is selected after the deceleration.

An armature coil of the disk-driving-motor has a center tap. A switch applies a voltage to the armature coil via the center tap when necessary in order to decrease energy consumption.

A field coil of the disk-driving-motor has the center tap. The switch applies a voltage to the field coil via the center tap when necessary in order to decrease energy consumption.

The operation mode of a disk signal regenerating apparatus includes an access mode, and data regenerating mode, hold track mode. According to the present invention, in the hold track mode, when a motor speed slower than a reference value is commanded, a control gain for controlling the motor speed is decreased.

The disk signal regenerating apparatus of the present invention comprises a power supply having a plurality of supply voltages, a controller selecting one supply voltage among a plurality of supply voltages, and an applying device for applying a selected supply voltage to the motor. This structure enables the apparatus to select a supply voltage for driving the motor so that energy consumption is minimized.

EXEMPLARY EMBODIMENT

Embodiment 1

Figure 1:
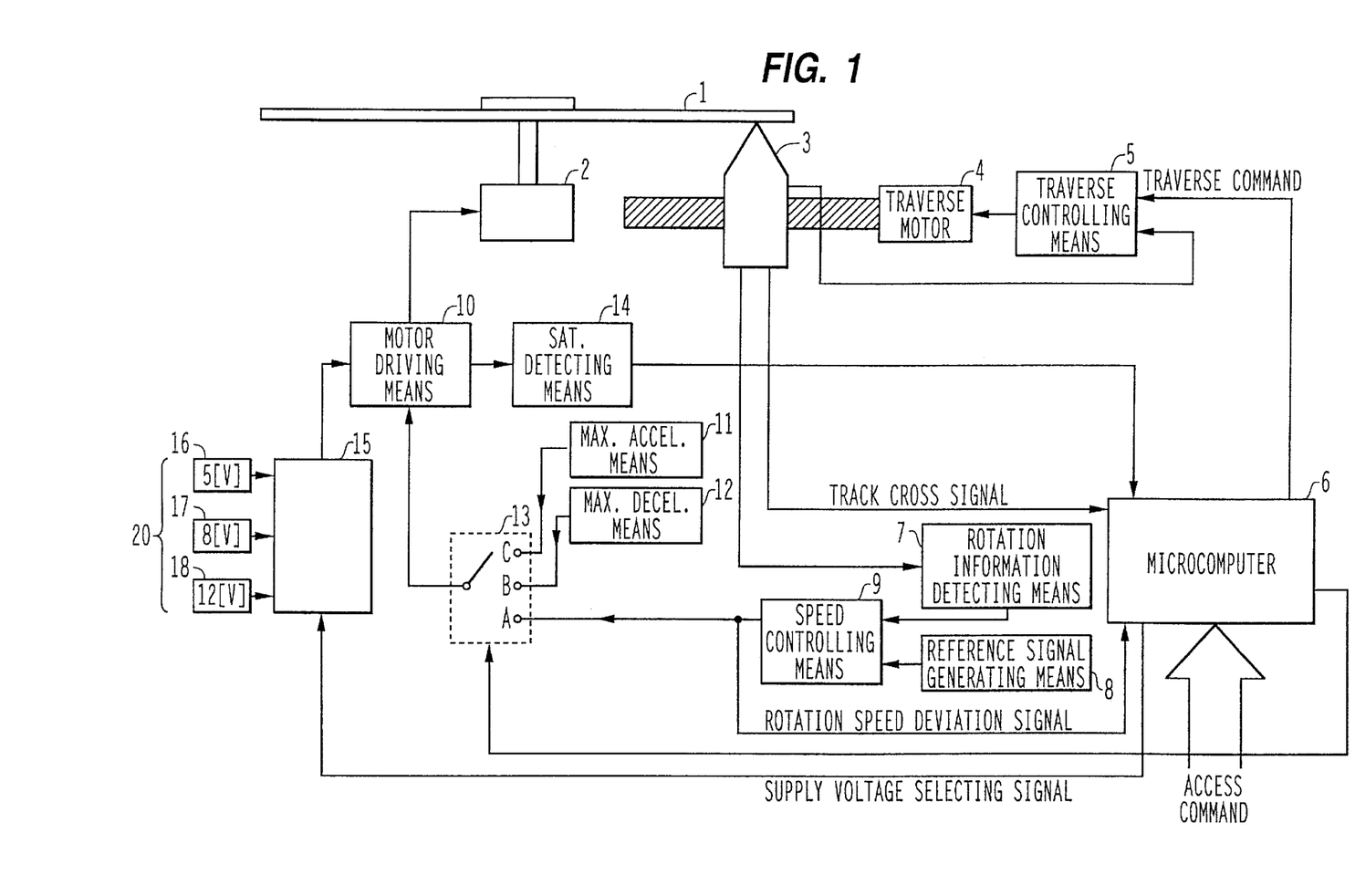
FIG. 1 illustrates a structure of disk signal regenerating apparatus of the present invention.

FIG. 1 illustrates a structure of the disk signal regenerating apparatus according to the present invention, and the common elements to those in FIG. 8 are numbered by the same numbers and are not explained. Elements proper to FIG. 1 are explained in the following paragraphs. Output from a speed control means 9 is fed to a micro-computer 6. A saturation detecting means 14 feeds a saturation signal to the micro-computer 6 when it detects saturation of a power transistor which supplies current to a spindle motor 2. A power supply 20 has supply voltages 16, 17 and 18, each of them has a different voltage. A supply voltage selecting means 15 selects one supply voltage among the supply voltages 16, 17 and 18 according to a supply voltage selecting signal from the micro-computer 6, and applies the voltage to the spindle motor 2 via a power transistor 901 (shown in FIG. 2) incorporated in the motor driving means 10.

Figure 2:
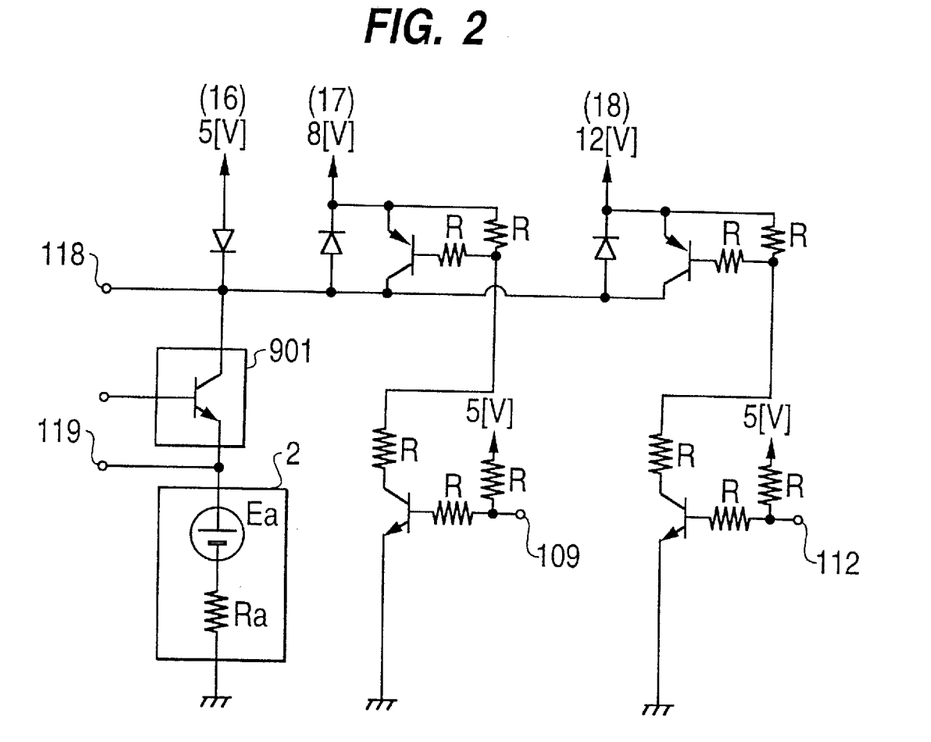
FIG. 2 illustrates a structure of supply voltage selecting means for driving a motor.

FIG. 2 illustrates couplings between the selecting means 15, supply voltages 16, 17, 18, the power transistor 901, and the spindle motor 2. The supply voltages 16, 17 and 18 are 5 V, 8 V, and 12 V respectively. Voltages other than these voltages can also be used. A voltage between monitor terminals 118 and 119 is fed to the saturation detecting means 14. Input terminals for the supply voltage selecting signal are numbered 109 and 112.

An operation of the disk signal regeneration apparatus has, same as the conventional art, three modes: access mode, data regeneration mode, and hold track mode. A rotation control of the spindle motor 2 has also three modes: compulsive rotation control, rough rotation control, and precise rotation control.

Figure 3:
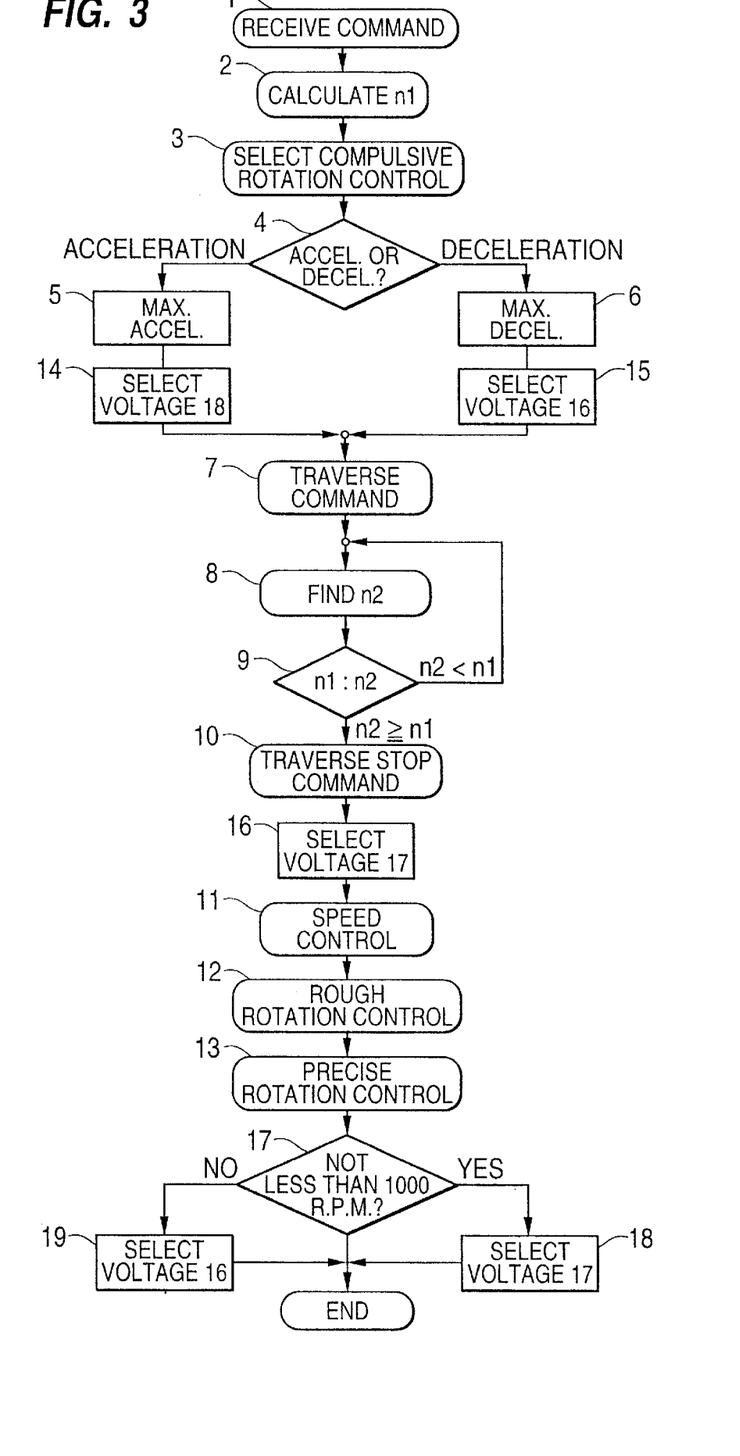
FIG. 3 illustrates an operation in an access mode of a micro-computer means incorporated in the disk signal regenerating apparatus of the present invention.

FIG. 3 illustrates an operation of the micro-computer 6 in the access mode:

Step 1. Receive an access command.

Step 2. Calculate a number of tracks n1 until an target address, and recognize a direction toward the target address.

Step 3. Select the compulsive rotation control.

Step 4. Judge whether the spindle motor is accelerated or decelerated.

Step 5. When the spindle motor 2 is accelerated, the switching means 13 connects the maximum accelerating means 11 (shown in FIG. 1) to the motor driving means 10. The maximum accelerating command is given to the motor driving means 10 by an open loop control.

Step 14. The supply voltage selecting means selects a supply voltage 18 (12 V.)

Step 6. When the spindle motor 2 is decelerated, the switching means 13 connects the maximum decelerating means 12 to the motor driving means 10. The maximum decelerating command is given to the motor driving means 10 by the open loop control.

Step 15. The supply voltage selecting means selects a supply voltage 16 (5 V.)

Step 7. The micro-computer 6 commands the traverse means 5 to move.

Step 8. The micro-computer 6 counts a number of track signals upto n2.

Step 9. Compare n1 with n2.

Step 10. When n2≧n1, the micro-computer 6 gives a command of halt to the traverse control means 5.

Step 16. The supply voltage selecting means selects the supply voltage 17 (8 V.)

Step 11. The switching means 13 connects the speed control means 9 to the motor driving means 10. The rotation control of spindle motor 2 is changed to a closed loop control.

Step 12. The rough rotation control, is select and the speed of the spindle motor 2 is controlled close to the target speed.

Step 13. Select the precise rotation control. The speed of the spindle motor 2 is controlled at the target speed precisely. The pickup means 3 detects the target address on the disk 1.

Step 17. Judge whether the target speed is less than 1000 r.p.m. or not.

Step 18. When the target speed is not less than 1000 r.p.m., the supply voltage selecting means selects the supply voltage 17 (8 V.)

Step 19. When the target speed is less than 1000 r.p.m. the supply voltage selecting means selects the supply voltage 16 (5V.)

The operation of the disk signal regeneration apparatus transfers to the data regeneration mode on the step 13. In the data regeneration mode, the pickup means 3 follows the spiral track on the disk to regenerate data. After regenerating data, the disk signal regenerating apparatus waits for the next access command in the track hold mode, where data is not regenerated. The pickup means 3 returns to the original position every rotation of the disk in order to follow the same track repeatedly.

FIG. 4(*a*) through FIG. 4(*f*) explain an energy loss generated due to the motor speed control. A power transistor 901 incorporated in the motor driving means represents a plurality of power transistors bridging each other or coupled in other forms. An armature coil 902 of the spindle motor 2, namely a motor coil includes a resistor Ra and induced voltage Ea. The motor coil 902 represents a polyphase coil with a monophase. A magnetic field of the spindle motor 2 comprises a permanent magnet (not shown). A power supply 20 includes the supply voltages 16, 17 and 18, and the voltages of 5 V, 8 V, or 12 V are selectively supplied.

The equations (1) through (7) used in the conventional art are also effective in this embodiment.

$$Ea = Ka \cdot N \quad (1)$$

$$Va = Ra \cdot Ia \quad (2)$$

$$Vd = Vm - Ea - Va = Vm - Ka \cdot N - Ra \cdot Ia \quad (3)$$

$$Pd = Vd \cdot Ia \quad (4)$$

$$Pa = Va \cdot Ia \quad (5)$$

$$Tq = Kt \cdot Ia \quad (6)$$

$$Vd = Vm + Ea - Va = Vm + Ka \cdot N - Ra \cdot Ia \quad (7)$$

The precise rotation control, compulsive rotation control, and rough rotation control of the spindle motor 2 are explained by using the following values which are the same as the conventional art. Ka=2.1 (mV/r.p.m.), Ra=20 (Ω), Ia.max=0.3 (A), Kt=200 (g·cm/A)

FIG. 4(*a*) and FIG. 4(*b*) illustrate the precise rotation control of the spindle motor 2. In FIG. 4(*a*), the motor rotates at a constant speed 2000 r.p.m. which requires a torque of 20 (g·cm) in order to maintain this constant speed. The supply voltage is 8 V, the same as that of the conventional art.

Figure 4A:
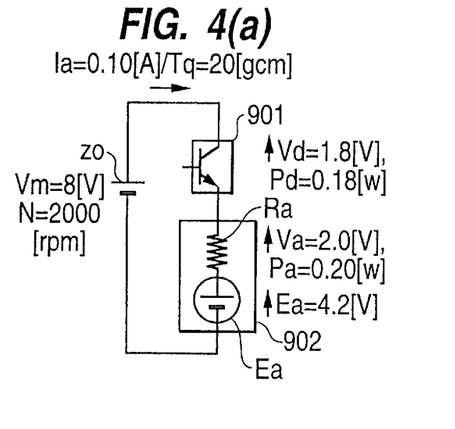
FIG. 4(a) through FIG. 4(f) explain energy loss due to a motor control according to the present invention.

Vm=8 (V)
Using the equation (6), Ia=0.1 (A)
Using the equation (1), Ea=4.2 (V)
Using the equation (3), Vd=1.8 (V)
Using the equation (4), Pd=0.18 (W)

The power consumption Pd of the power transistor is the same as shown in FIG. 10(*a*) of the conventional art. In general, this power consumption is not a problematic factor in a long-time precise-rotation-control for the data regeneration mode or hold track mode.

FIG. 4(*b*) illustrates the motor rotating at a constant speed of 500 r.p.m, which requires a torque of 20 (g cm), the same as shown in FIG. 4(*a*). Since a target speed is less than 1000 r.p.m., the supply voltage 5 V is selected.

Figure 4B:
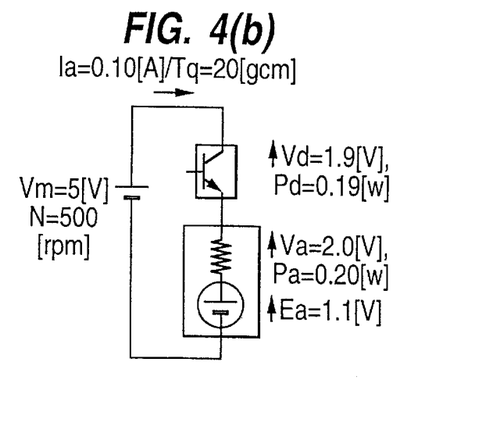

Vm=5 (V)
Using the equation (1), Ea=1.1 (V)
Using the equation (3), Vd=1.9 (V)
Using the equation (4), Pd=0.19 (W)

The power consumption Pd is reduced from 0.49 W of the conventional art to 0.19 W. This power consumption is not a problematic factor in the long-time precise-rotation-control for the data regeneration mode or hold track mode. The power consumption of the power transistor at a low-motor-speed can be reduced by lowering the supply voltage.

FIG. 4(*c*) and FIG. 4(*d*) illustrate an acceleration of the spindle motor 2 in the compulsive rotation control and the rough rotation control. An example shows that N1=1000 r.p.m. is accelerated to N2=2000 r.p.m. The supply voltage is boosted from 8 V to 12 V just before starting acceleration. Since the supply voltage is high, motor current is always kept at 0.3 A maximum value.

In the case of FIG. 4(*c*), when starting acceleration, the speed is 1000 r.p.m.

Figure 4C:
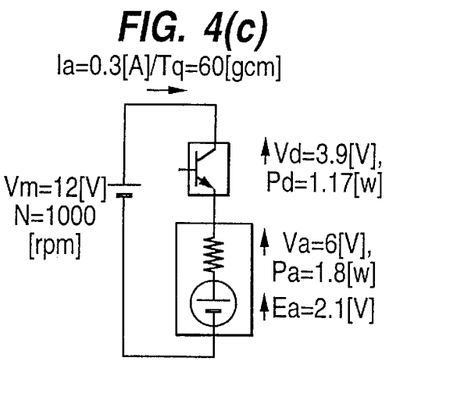

Vm=12 (V)
Using the equation (1), Ea=2.1 (V)
Motor current Ia=0.3 (A)
Using the equation (2), Va=6 (V)
Using the equation (3), Vd=3.9 (V)
Using the equation (6), Tq=60 (g cm)

In the case of FIG. 4(*d*), just before ending acceleration, the speed is 2000 r.p.m.

Figure 4D:
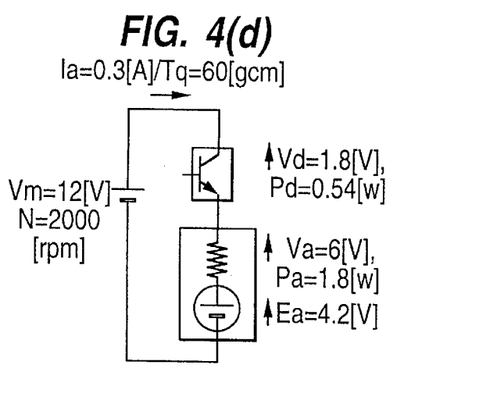

Vm=12 (V)
Using the equation (1), Ea=4.2 (V)
Motor current Ia=0.3 (A)
Using the equation (2), Va=6 (V)
Using the equation (3), Vd=1.8 (V)
Using the equation (6), Tq=60 (g cm)

In the case of acceleration illustrated in FIG. 4(*c*) and FIG. 4(*d*), a greater torque than that of the conventional art shown in FIG. 10(*c*) and FIG. 10(*d*) can be obtained by boosting the supply voltage, and an acceleration time becomes shorter because the torque does not decrease during the acceleration.

FIG. 4(*e*) and FIG. 4(*f*) illustrate a deceleration of the spindle motor 2 in the compulsive and rough rotation controls. The speed is decelerated by a reverse phase braking. The power transistor 901 in a bridge coupling supplies a reverse supply voltage to the motor so that the motor generates counter torque. The example shows that N2=2000 r.p.m. is decelerated to N1=1000 r.p.m. The supply voltage applied reversely is lowered from 8 V to 5 V just before starting deceleration. In the case of FIG. 4(*e*), the motor speed is 2000 r.p.m. when the deceleration starts.

Figure 4E:
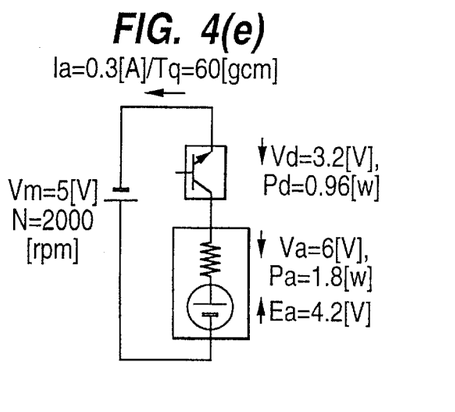

Vm=5 (V)
Using the equation (1), Ea=4.2 (V)
Motor current Ia=0.3 (A)
Using the equation (2), Va=6 (V)
Using the equation (7), Vd=3.2 (V)
Using the equation (4), Pd=0.96 (W)
Using the equation (5), Pa=1.8 (W)
Using the equation (6), Tq=60 (g cm)

In the case of FIG. 4(*f*), just before ending the deceleration the speed is 1000 r.p.m.

Figure 4F:
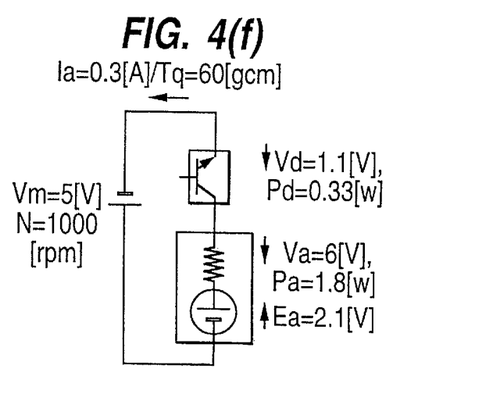

Vm=5 (V)
Using the equation (1), Ea=2.1 (V)

Using the equation (2), Va=6 (V)
Using the equation (7), Vd=1.1 (V)
Using the equation (4), Pd=0.33 (W)
Using the equation (5), Pa=1.8 (W)
Using the equation (6), Tq=60 (g cm)

In the deceleration shown in FIG. 4(e) and FIG. 4(f), the power transistor consumes less power than in the conventional art shown in FIG. 10(e) and FIG. 10(f) because the supply voltage is lowered.

The power consumption of power transistor in the low-speed precise rotation control thus can be reduced to a non problematic level in the long-time precise-rotation-control of the data regeneration mode or hold track mode by lowering the supply voltage. Further, in the compulsive rotation control and rough rotation control of the spindle motor 2, the acceleration time can be shortened by boosting the supply voltage. The power consumption of the power transistor at speed deceleration can be reduced by lowering the supply voltage.

Embodiment 2

When a motor speed is accelerated or decelerated from N1 to N2, if a power transistor is kept unsaturated and Ia is kept constant, a voltage across the power transistor stays between Vd1 and Vd2 specified by the following equation (9):

$$Vd1 = Vm + (sgn)\, Ka \cdot N1 - Ra \cdot Ia$$

$$Vd2 = Vm + (sgn)\, Ka \cdot N2 - Ra \cdot Ia \tag{9}$$

where (sgn)=(+) in decelerating, and (−) in accelerating

Since Ia is kept constant, a torque of acceleration or deceleration is also kept constant. The voltages across a motor speed and the power transistor change linearly with regard to time. An average power consumption of the power transistor during acceleration or deceleration is found by the equation (10) below:

$$Pd = \{(Vd1+Vd2)/2\} \cdot Ia = \{Vm+(sgn)\, Ka\cdot(N1+N2)/2 - Ra\cdot Ia\}\cdot Ia \tag{10}$$

An average power consumption of a motor coil is found by the following equation (11).

$$Pa = Ra \cdot Ia \cdot Ia \tag{11}$$

A total average power consumption is found by the following equation (12):

$$P = Pd + Pa = \{Vm + (sgn)\, Ka\cdot(N1+N2)/2\}\cdot Ia \tag{12}$$

This equation (12) reveals that the total average power consumption is independent of a coil resistor Ra.

Using the equation (8), an acceleration time between N1 and N2 is found by the equation (13):

$$dt = \frac{(sgn)(N1-N2)\cdot J}{(Kj \cdot Tq)} \tag{13}$$

Since torque and Ia are kept constant during acceleration and reduction, the following equation (14) is found.

$$dt = \frac{(J/Kj)(sgn)(N1-N2)}{(Kt \cdot Ia)} \tag{13}$$

A total energy loss (W) during the acceleration or reduction is found as follows:

$$\begin{aligned}W = P\, dt &= \{Vm' + (sgn)\, Ka\cdot(N1+N2)/2\}\cdot(J/Kj)\cdot(sgn)(N1-N2)/(Kt) \\ &= [K1\cdot Vm/Kt] + [K2\cdot(sgn)Ka/Kt]\end{aligned} \tag{15}$$

where
K1=(J/Kj)·(sgn)(N1−N2)
K2=(J/Kj)(N1+N2)/2·(sgn)(N1−N2)

Since Ka=0.1026 Kt is found, the second member of the equation (15) is constant. Accordingly when the power transistor is kept unsaturated and Ia is kept constant, the total energy loss; during acceleration or deceleration can be reduced by a lower supply voltage and a greater torque constant Kt.

The energy loss is described as follows by using FIG. 4: If any supply voltage Vm can be set in FIG. 4, the following calculation is found. In the case of FIG. 4(c) and FIG. 4(d), the supply voltage Vm is set at 9.5 V when starting acceleration from a motor speed of 1000 r.p.m. The supply voltage is changed to 11.5 V to prevent the power transistor from being saturated due to increasing of induced voltage during the acceleration.

When starting acceleration, Vm=9.5 V
Using the equation (1), Ea=2.1 V
Using the equation (3), Vd=1.4 V
Using the equation (4), Pd=0.42 W Just before ending the acceleration, the motor speed reaches 2000 r.p.m., and Vm=11.5 V
Using the equation (3), Vd=1.3 V
Using the equation (4), Pd=0.39 W The power consumption Pd of power transistor thus becomes lower than that of embodiment 1. Since motor current Ia is the same, the power consumption of the motor coil resistor and the acceleration time are also the same as those of embodiment 1. The total energy loss is hence lower than that of embodiment 1 by a decrease of Pd.

In the case of FIG. 4(e) and FIG. 4(f), The supply voltage is set at 3.0 V when starting speed deceleration from 2000 r.p.m. and changed to 5.0 V during the deceleration in order to prevent the power transistor from being saturated.

When starting speed deceleration, Vm=3 V
Using the equation (7), Vd=1.2 V
Using the equation (4), Pd=0.36 W Just before ending the deceleration, the motor speed reaches 1000 r.p.m., and Vm=5 V
Using the equation (3), Vd=1.1 V
Using the equation (4), Pd=0.33 W The power consumption Pd of power transistor thus becomes lower than that of embodiment 1. Since motor current Ia is same, the power consumption of the motor coil resistor and the reduction time are also same as those of embodiment 1. The total energy loss is hence lower than that of embodiment 1 by a decrease of Pd.

The power consumption of power transistor is thus reduced by lowering the supply voltage provided the power transistor is kept unsaturated. The supply voltage during acceleration or deceleration can be changed without saturating the power transistor through monitoring an output of the saturation detecting means 14.

Embodiment 3

Figure 5:
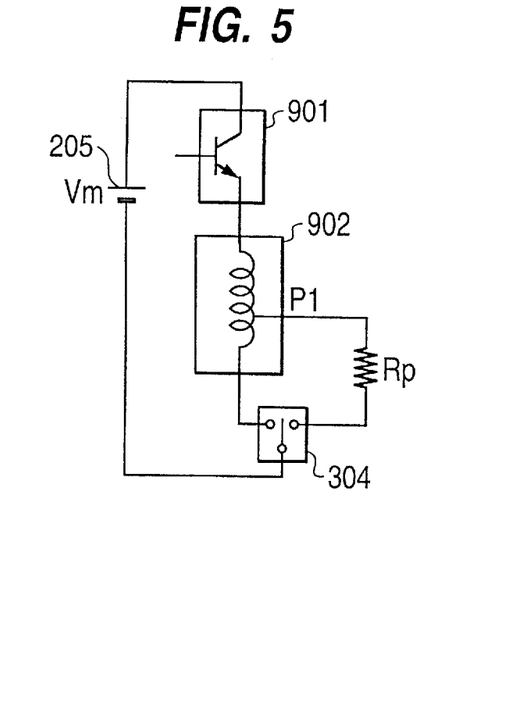
FIG. 5 illustrates a mechanism of driving a spindle motor of the exemplary embodiment 3 of the present invention. An outer resistor Rp is connected to a center tap P1 of a motor coil.

FIG. 5 illustrates a driver structure of a spindle motor. A power transistor 901 is incorporated in the motor driving means. An armature coil 902 of the spindle motor 2 is namely a motor coil. Vm is a supply voltage of power supply 205. The motor coil 902 represents a polyphase coil with a monophase. A magnetic field of spindle motor 2 comprises a permanent magnet (not shown). An external resistance Rp is connected to a center tap P1 of the motor coil. A switching means 304 connects the motor coil 902 or the external resistance Rp alternately to the power supply 205. The motor coil following the center tap P1 has a coil resistance Rp same as the external resistance Rp. The coil resistance of the motor coil thus seems always constant, regardless of the alternating by the switching means 304, viewed from the power supply. However, a torque constant Kt and induced voltage constant Ka changes due to the alternating by the switch means 304.

When the switching means 304 selects the motor coil, Kt=400 g·cm/A and Ka=4.2 mV/r.p.m. would be found. When the switching means 304 selects the external resistance, Kt=200 g·cm/A, and Ka=2.1 mV/r.p.m. would be found. In the case of FIG. 4(c) and FIG. 4(d), the switching means 304 selects the motor coil when starting acceleration of the motor from 1000 r.p.m. During the acceleration, the switching means 304 changes the selection to the external resistance to reduce the induced voltage constant Ka, which increases the induced voltage to keep the power transistor unsaturated.

When starting the acceleration, Vm=12 V

Using the equation (1), Ea=4.2 V

Using the equation (3), Vd=1.8 V

Using the equation (4), Pd=0.54 W

Thus the power consumption of the power transistor is reduced. Since the power transistor is kept unsaturated, the motor current Ia stays always 0.3 A whichever the switching means 304 selects, and a power consumption Pa of the coil resistance keeps a constant value 1.8 W. Even when the motor current Ia keeps a constant value, an acceleration time is shortened because the torque constant is increased. The total energy loss is thus decreased by the decreases of the power consumption of power transistor and of acceleration time.

In the case of FIG. 4(e) and FIG. 4(f), the switching means 304 selects the motor coil. When starting deceleration of the motor speed from 2000 r.p.m., Vm=5 V Using the equation (1), Ea=8.4 V Using the equation (7), Vd=7.4 V Using the equation (4), Pd=2.2 W The power consumption of the power transistor is increased compared with the embodiment 1. Just before ending the speed deceleration when the motor speed reaches 1000 r.p.m., using the equation (7), Vd=3.2 V using the equation (4), Pd=0.96 W The power consumption of the power transistor is increased compared with the embodiment 1. Since the power transistor is kept unsaturated, the motor current Ia keeps a constant value 0.3 A, and the power consumption of coil resistance Pa also keeps a constant value 1.8 W. The total average power consumption is found by this equation:

$$P=(2.2+0.96)/2 +1.8=3.38 W$$

The total power consumption is increased compared with the embodiment 1. However, since the reduction time is shortened by 50% because of increasing torque constant, the total energy loss is decreased.

Embodiment 4

Figure 6:
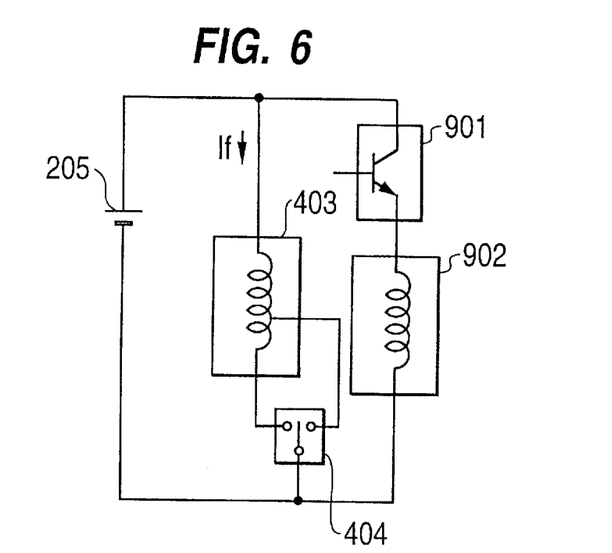
FIG. 6 illustrates a mechanism of driving the spindle motor of the exemplary embodiment 4 of the present invention. Field current can be adjusted by selecting a center tap of a field coil.

FIG. 6 illustrates a driver structure of a spindle motor of the embodiment 4. A power transistor 901 is incorporated in the motor driving means. An armature coil 902 of the spindle motor 2 is namely a motor coil. A supply voltage is represented by 205. The motor coil 902 represents a polyphase coil with a monophase. A magnetic field of spindle motor comprises a field coil 403. Supply voltages other than 205 can be used for the field coil 403. A switching means 404 adjusts field current If to change a torque constant by selecting a center tap of a field coil 403. As described in the embodiment 3, a total energy loss can be reduced by changing the torque constant.

Embodiment 5

Figure 7:
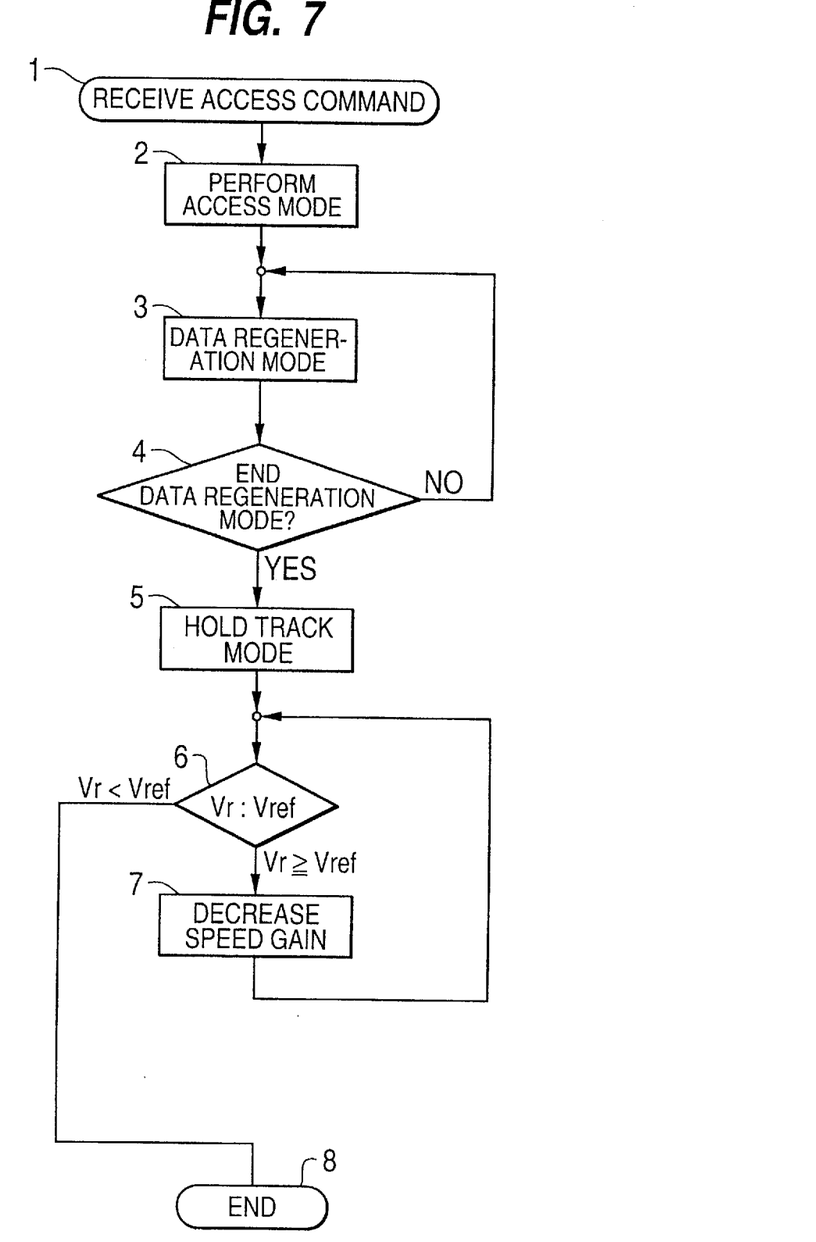
FIG. 7 shows a transition of an operation mode of the microcomputer means; access mode, data regenerating mode, hold track mode, in this order.

FIG. 7 illustrates the operational mode transition of micro-computer 6 in the following order; access mode, data regeneration mode, and hold track mode.

Step 1. Receive an access command.

Step 2. Perform the access mode according to the steps described in FIG. 3. At the end of Step 2, the speed of spindle motor 2 is precisely controlled at the target speed by the precise rotation control.

Step 3. Operate the data regeneration mode.

Step 4. End the data regeneration mode.

Step 5. Start the hold track mode. Move the pickup means 3 by one track every rotation so that the pickup means 3 can always follow the same track of the disk.

Step 6. Compare a rotational speed signal Vr with a reference speed signal Vref.

Step 7. When Vr is not less than Vref, a speed gain Gr of the speed control means 9 is decreased from an initial value Gri, for example, by 2 dB.

Step 8. When Vr is less than Vref, the hold track mode is kept and the next access command is awaited.

A decrease of the speed gain Gr of speed control means 9 reduces motor current, and thereby energy loss and temperature rise due to long-time or frequent hold track modes can be avoided.

Embodiment 6

Figure 11:
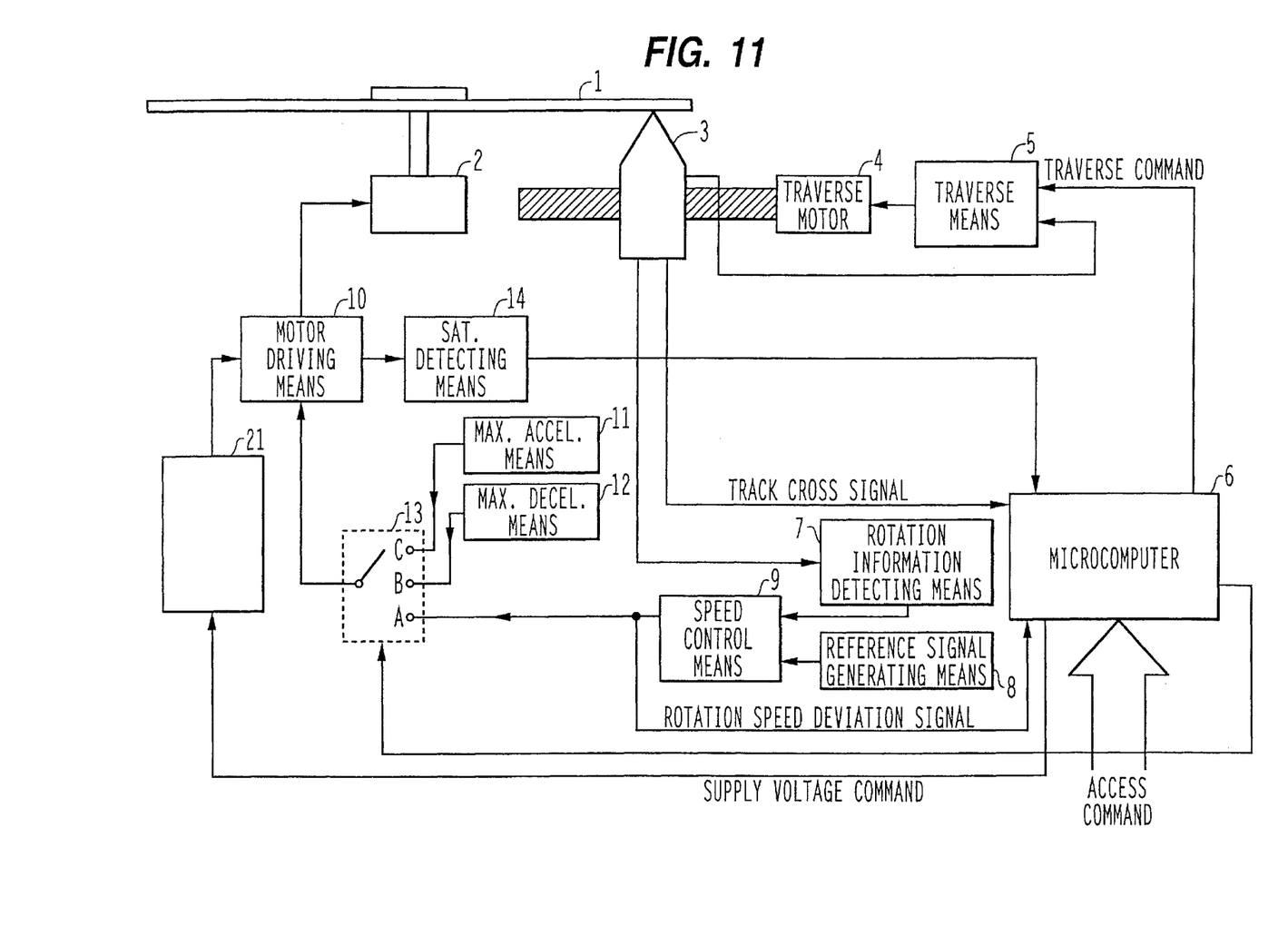
FIG. 11 shows exemplary embodiment 6.

FIG. 11 illustrates embodiment 6. In comparison with FIG. 1, a power supply 21 instead of power supply 20 is employed, the supply voltage selecting means 15 is deleted, and the micro-computer 6 outputs a supply voltage command instead of the supply voltage selecting signal. The micro-computer 6 follows signals from the pickup means 3, a saturated voltage detecting means 14, and the speed control means 9 as well as the access command, and determines a supply voltage to minimize the energy loss and temperature rise of the apparatus, and finally outputs a supply voltage command. The power supply 21 generates a DC voltage which is specified by the supply voltage command. Since the power supply does not have a plurality of supply voltages, a compact body size can be realized.

What is claimed is:

1. A rotation control method of a disk drive spindle motor, said rotation control method using a plurality of supply voltages V1, V2 and V3 where a selected one of the plurality of supply voltages is fed through a power transistor and where V1>V2 >V3, said rotation control method including:

at least one of 1) a precise rotation mode, 2) an acceleration mode and 3) a deceleration mode;

wherein, 1) in the precise rotation mode, a rotation speed of the spindle motor is controlled to conform with a target rotation speed through speed feedback control, V2, a normal supply voltage, is selected when the target rotation speed is equal to or above a specified speed, and V3, a lower supply voltage, is selected when the target rotation speed is less than the specified speed, 2) in the acceleration mode, a rotation speed of the spindle motor is controlled through open loop control, and acceleration is achieved by selecting V1, a higher supply voltage, and 3) in the deceleration mode, a rotation speed of the spindle motor is controlled through open loop control using reverse phase breaking, and deceleration is achieved by selecting V3, a lower supply voltage, and wherein each of the supply voltages V1, V2 and V3 has a voltage level which does not saturate the power transistor, when it is selected.

2. The rotation control method as claimed in claim 1, further using supply voltages V0 and V4 where V0>V1>V2>V3>V4; wherein, 2) in the acceleration mode, supply voltage V1 is selected at a start of acceleration and then V0, a higher supply voltage, is selected during acceleration, and 3) in the deceleration mode, supply voltage V4 is selected at a start of deceleration and then V3, a higher supply voltage, is selected during deceleration, and wherein each of the supply voltages V0 and V4 has a voltage level which does not saturate the power transistor, when it is selected.

* * * * *